(12) United States Patent
Oh et al.

(10) Patent No.: US 11,662,868 B2
(45) Date of Patent: May 30, 2023

(54) TOUCH DISPLAY DEVICE

(71) Applicant: LG DISPLAY CO., LTD., Seoul (KR)

(72) Inventors: Wooram Oh, Gyeongsangbuk-do (KR); JeHyung Park, Daegu (KR); Hanbin Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/488,855

(22) Filed: Sep. 29, 2021

(65) Prior Publication Data
US 2022/0171498 A1    Jun. 2, 2022

(30) Foreign Application Priority Data
Nov. 30, 2020  (KR) ................. 10-2020-0163672

(51) Int. Cl.
*G06F 3/044*    (2006.01)
*G06F 3/041*    (2006.01)

(52) U.S. Cl.
CPC ........ *G06F 3/0446* (2019.05); *G06F 3/04166* (2019.05); *G06F 3/04184* (2019.05); *G06F 2203/04111* (2013.01)

(58) Field of Classification Search
CPC ............... G06F 3/0446; G06F 3/04166; G06F 3/04184; G06F 2203/04111
See application file for complete search history.

(56) References Cited

U.S. PATENT DOCUMENTS

| | | | | |
|---|---|---|---|---|
| 2005/0134579 A1* | 6/2005 | Hsieh | ................ | G09G 5/006 345/204 |
| 2013/0314625 A1* | 11/2013 | Tsai | ................ | G02F 1/13338 349/12 |
| 2016/0307971 A1* | 10/2016 | Jeon | ................ | G09G 3/3233 |
| 2018/0129330 A1* | 5/2018 | Ding | ................ | G06F 3/0443 |
| 2019/0220123 A1* | 7/2019 | Kanaya | ............. | G06F 3/04164 |
| 2020/0401273 A1* | 12/2020 | Bang | ................ | H10K 50/844 |
| 2021/0223940 A1* | 7/2021 | Li | ................ | H01L 27/3244 |
| 2022/0075483 A1* | 3/2022 | Yan | ................ | G06F 3/04164 |

* cited by examiner

*Primary Examiner* — Md Saiful A Siddiqui
(74) *Attorney, Agent, or Firm* — Morgan, Lewis & Bockius LLP

(57) ABSTRACT

The present disclosure relates to a touch display device including a display panel in which a plurality of touch electrode lines including a plurality of X-touch electrode lines extending to a first direction and a plurality of Y-touch electrode lines extending to a second direction, and a plurality of subpixels are disposed; a touch driving circuit for supplying a touch driving signal to the display panel and sensing a touch by detecting a touch sensing signal; at least one or more pseudo touch routing lines disposed along a non-display area of the display panel; and a plurality of pseudo touch electrode lines extending from the at least one or more pseudo touch routing lines and spaced apart from each other at a reference interval.

19 Claims, 13 Drawing Sheets

(a)

(b)

TOUCH DISPLAY DEVICE

CROSS REFERENCE TO RELATED APPLICATION

This application claims priority from Korean Patent Applications No. 10-2020-0163672, filed on Nov. 30, 2020, which are hereby incorporated by reference for all purposes as if fully set forth herein.

BACKGROUND

Technical Field

The present disclosure relates to a touch display device capable of reducing electromagnetic interference.

Discussion of the Related Art

With the development of the information society, there has been an increasing demand for a variety of types of image display devices. In this regard, a range of display devices, such as liquid crystal display device, electroluminescence display device, or quantum dot light emitting display device have recently come into widespread use.

In order to provide more diverse functions, such a display device provides a function of detecting a user's finger touch or a pen touch on a display panel and performing a signal processing based on the detected touch data.

As an example, a display device capable of detecting a touch includes a plurality of touch electrodes disposed or embedded in the display panel, and may detect a presence of a user's touch and touch coordinates on the display panel by driving these touch electrodes.

In addition, such a touch display device may be used not only as mobile devices such as smartphones and tablet PCs, but also in automotive displays. In this case, the touch display device may use an antenna to communicate with other devices.

In this case, when a touch display device using the antenna transmits and receives a radio signal in a high frequency band, such as 5G mmWave service, electromagnetic interference with the touch driving signal causes tends to deteriorate a performance of the radio signal transmission and reception and touch sensing performance.

SUMMARY

Accordingly, embodiments of the present disclosure are directed to a touch display device that substantially obviates one or more of the problems due to limitations and disadvantages of the related art.

An aspect of the present disclosure is to provide a touch display device capable of reducing electromagnetic interference between the radio signal and the touch driving signal.

Another aspect of the present disclosure is to provide a touch display device capable of reducing electromagnetic interference through an effective arrangement of pseudo electrodes disposed in a non-display area of the touch display device.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a touch display device comprises a display panel in which a plurality of touch electrode lines including a plurality of X-touch electrode lines extending to a first direction and a plurality of Y-touch electrode lines extending to a second direction, and a plurality of subpixels are disposed; a touch driving circuit for supplying a touch driving signal to the display panel and sensing a touch by detecting a touch sensing signal; at least one or more pseudo touch routing lines disposed along a non-display area of the display panel; and a plurality of pseudo touch electrode lines extending from the at least one or more pseudo touch routing lines and spaced apart from each other at a reference interval.

In the touch display device according to an embodiment of present disclosure, the plurality of X-touch electrode lines may be touch driving electrode lines and the plurality of Y-touch electrode lines may be touch sensing electrode lines.

In the touch display device according to an embodiment of present disclosure, the plurality of pseudo touch electrode lines may be disposed in a direction parallel to the plurality of X-touch electrode lines.

In the touch display device according to an embodiment of present disclosure, a pseudo touch driving signal having a phase opposite to the touch driving signal may be supplied the plurality of pseudo touch electrode lines.

In the touch display device according to an embodiment of present disclosure, the reference interval may be shorter than a wavelength of a radio signal received through an antenna.

In the touch display device according to an embodiment of present disclosure, the reference interval may be different from an adjacent reference interval.

In the touch display device according to an embodiment of present disclosure, the plurality of pseudo touch electrode lines may include at least one pseudo touch bridge line electrically connecting adjacent pseudo touch electrode lines.

In the touch display device according to an embodiment of present disclosure, a plurality of pseudo touch bridge lines may have intervals shorter than a wavelength of a radio signal received through an antenna between the pseudo touch bridge lines.

In the touch display device according to an embodiment of present disclosure, the plurality of pseudo touch electrode lines may include at least one delay resistor for delaying time to transmit a signal.

In the touch display device according to an embodiment of present disclosure, the plurality of X-touch electrode lines may be divided into a plurality of groups, and the plurality of pseudo touch routing lines may be matched to the plurality of groups of X-touch electrode lines when the plurality of pseudo touch routing lines may be arranged in plurality.

In the touch display device according to an embodiment of present disclosure, a number of a first group pseudo touch electrode lines extending from a first pseudo touch routing line may be different from a number of second group pseudo touch electrode lines extending from a second pseudo touch routing line.

In the touch display device according to an embodiment of present disclosure, a total interval occupied by the first group pseudo touch electrode lines may be different from a total interval occupied by the second group pseudo touch electrode lines.

In the touch display device according to an embodiment of present disclosure, at least one pseudo touch electrode line selected from the second group pseudo touch electrode lines may be disposed in a space between the first group pseudo touch electrode lines.

In the touch display device according to an embodiment of present disclosure, a first pseudo touch driving signal supplied to the first group pseudo touch electrode lines may have a phase opposite to the touch driving signal supplied to the first group X-touch electrode lines, and a second pseudo touch driving signal supplied to the second group pseudo touch electrode lines may have a phase opposite to the touch driving signal supplied to the second group X-touch electrode lines.

According to embodiments of the present disclosure, it is possible to provide a touch display device capable of reducing electromagnetic interference between the radio signal and the touch driving signal.

In addition, according to embodiments of the present disclosure, it is possible to provide a touch display device capable of minimizing electromagnetic interference through an effective arrangement of pseudo electrodes disposed in a non-display area of the touch display device.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
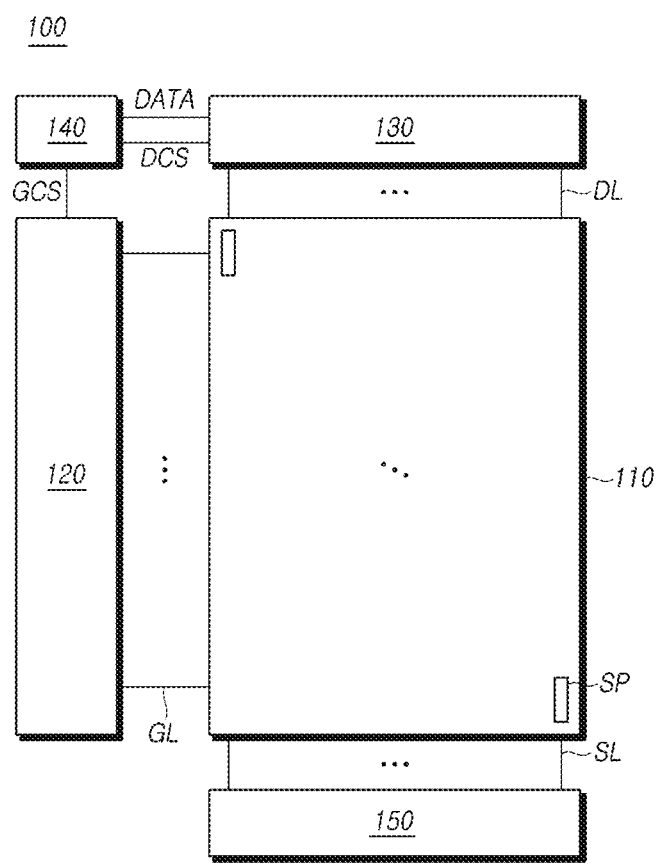
FIG. 1 illustrates a schematic diagram of a touch display device according to embodiments of the present disclosure.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in a variety of different forms. Rather, these embodiments are provided so that the present disclosure will be thorough and complete, and will fully convey the scope of the present disclosure to those having ordinary knowledge in the technical field. The scope of the present disclosure shall be defined by the appended claims.

The shapes, sizes, ratios, angles, numbers, and the like, inscribed in the drawings to illustrate exemplary embodiments are illustrative only, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in the situation in which the subject matter of the present disclosure may be rendered unclear thereby. It will be understood that the terms "comprise", "include", "have", and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

When spatially relative terms, such as "on", "above", "under", "below", and "on a side of", are used herein for descriptions of relationships between one element or component and another element or component, one or more intervening elements or components may be present between the one and other elements or components, unless a term, such as "directly", is used.

When temporally relative terms, such as "after", "subsequent", "following", and "before" are used to define a temporal relationship, a non-continuous case may be included unless the term "immediately" or "directly" is used.

In descriptions of signal transmission, such as "a signal is sent from node A to node B", a signal may be sent from node A to node B via another node unless the term "immediately" or "directly" is used.

In addition, terms, such as "first" and "second" may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of exemplary embodiments of the present disclosure may be partially or entirely coupled or combined with each other and may work in concert with each other or may operate in a variety of technical methods. In addition, respective exemplary embodiments may be carried out independently or may be associated with and carried out in concert with other embodiments.

Hereinafter, a variety of embodiments will be described in detail with reference to the accompanying drawings.

FIG. 1 illustrates a schematic diagram of a touch display device according to embodiments of the present disclosure.

Referring to FIG. 1 the touch display device 100 according to embodiments of the present disclosure may include a display panel 110, a gate driving circuit 120, a data driving circuit 130, a timing controller 140 and a touch driving circuit 150 to detect a touch on the display panel 110.

A plurality of gate lines GL and a plurality of data lines DL are disposed in the display panel 110, and a plurality of subpixels SP are disposed in areas in which the gate lines GL intersect the data lines DL.

In addition, a plurality of touch electrodes may be disposed on or within the display panel 110, and a plurality of sensing lines SL electrically connecting the touch electrodes and the touch driving circuit 150 may be disposed in the display panel 110.

Describing a display driving operation in the touch display device 100, the gate driving circuit 120 controls the driving timing of the subpixels SP disposed in the display panel 110. In addition, the data driving circuit 130 supplies a data voltage corresponding to image data to the subpixels SP, so that the subpixels SP are displaying an image by illuminating luminous intensities corresponding to grayscale levels of the image data.

Specifically, the gate driving circuit 120 is controlled by the timing controller 140, and controls the driving timing of the plurality of subpixels SP by sequentially supplying scan signals to the plurality of gate lines GL disposed in the display panel 110.

The gate driving circuit 120 may include one or more gate driving integrated circuits (GDIC), which may be disposed on one or both sides of the display panel 110, depending on the driving scheme. Alternatively, the gate driving circuit 120 may be implemented with a gate-in-panel (GIP) structure directly embedded in a bezel area of the display panel 110.

The data driving circuit 130 receives digital image data from the timing controller 140, and converts the received digital image data into an analog data voltage. In addition, the data driving circuit 130 supplies the data voltage to the respective data lines DL at time which the scan signals are supplied through the gate lines GL, so that the respective subpixels SP display luminous intensities according to the data voltage.

The data driving circuit 130 may include one or more source driving integrated circuits (SDICs).

The timing controller 140 supplies a variety of control signals to the gate driving circuit 120 and the data driving circuit 130, and controls the operations of the gate driving circuit 120 and the data driving circuit 130.

The timing controller 140 controls the gate driving circuit 120 to supply the scan signals at time according to timing realized by respective frames, converts source image data received from an external source into an image data DATA with a format readable by the data driving circuit 130, and supplies the converted image data DATA to the data driving circuit 130.

The timing controller 140 also receives a variety of timing signals, including a vertical synchronization signal, a horizontal synchronization signal, an input data enable signal, a clock signal, and the like, from the external source (e.g. a host system).

The timing controller 140 may generate a variety of control signals DCS, GCS using the variety of timing signals received from the external source, and supply the variety of control signals DCS, GCS to the gate driving circuit 120 and the data driving circuit 130.

For example, the timing controller 140 generates a variety of gate control signals GCS, including a gate start pulse signal, a gate shift clock signal, a gate output enable signal, and the like, to control the gate driving circuit 120.

Here, the gate start pulse signal is used to control the operation start timing of one or more gate driving integrated circuits in the gate driving circuit 120. The gate shift clock signal is a clock signal commonly supplied to the one or more gate driving integrated circuits to control the shift timing of the scan signals. The gate output enable signal designates timing information of the one or more gate driving integrated circuits.

In addition, the timing controller 140 generates a variety of data control signals DCS, including a source start pulse signal, a source sampling clock signal, a source output enable signal, and the like, to control the data driving circuit 130.

Here, the source start pulse signal is used to control the data sampling start timing of one or more source driving integrated circuits in the data driving circuit 130. The source sampling clock signal is a clock signal for controlling the sampling timing of data voltage in each of the source driving integrated circuits. The source output enable signal controls the output timing of the data driving circuit 130.

The touch display device 100 may further include a power management integrated circuit for supplying various types of voltage or current to the display panel 110, the gate driving circuit 120, the data driving circuit 130, and the like, or controls various types of voltage or current to be supplied to the same.

The subpixels SP are defined by the intersections of the gate lines GL and the data lines DL. Liquid crystals or light-emitting elements may be disposed in the subpixels SP, depending on the type of the touch display device 100.

For example, in a case in which the touch display device 100 is a liquid crystal display device, the touch display device 100 includes a light source device, such as a back-light unit, to illuminate the display panel 110, and liquid crystals are disposed in the subpixels SP of the display panel 110. In addition, the touch display device 100 may display luminous intensities and an image data by adjusting the alignment of the liquid crystals using electromagnetic fields generated in response to the data voltage supplied to the subpixels SP.

In the case of a liquid crystal display device, the display panel 110 includes a liquid crystal layer formed between two substrates, and it may be operated in any known mode such as Twisted Nematic (TN) mode, Vertical Alignment (VA) mode, In Plane Switching (IPS) mode, or Fringe Field Switching (FFS) mode. On the other hand, in the case of an electroluminescent display device, the display panel 110 may be implemented in a top emission type, a bottom emission type, or a dual emission type.

In addition, the touch display device 100 according to embodiments of the present disclosure may detect a user's touch on the display panel 110 using the touch electrodes TE included in the display panel 110, and the touch driving circuit 150.

Figure 2:
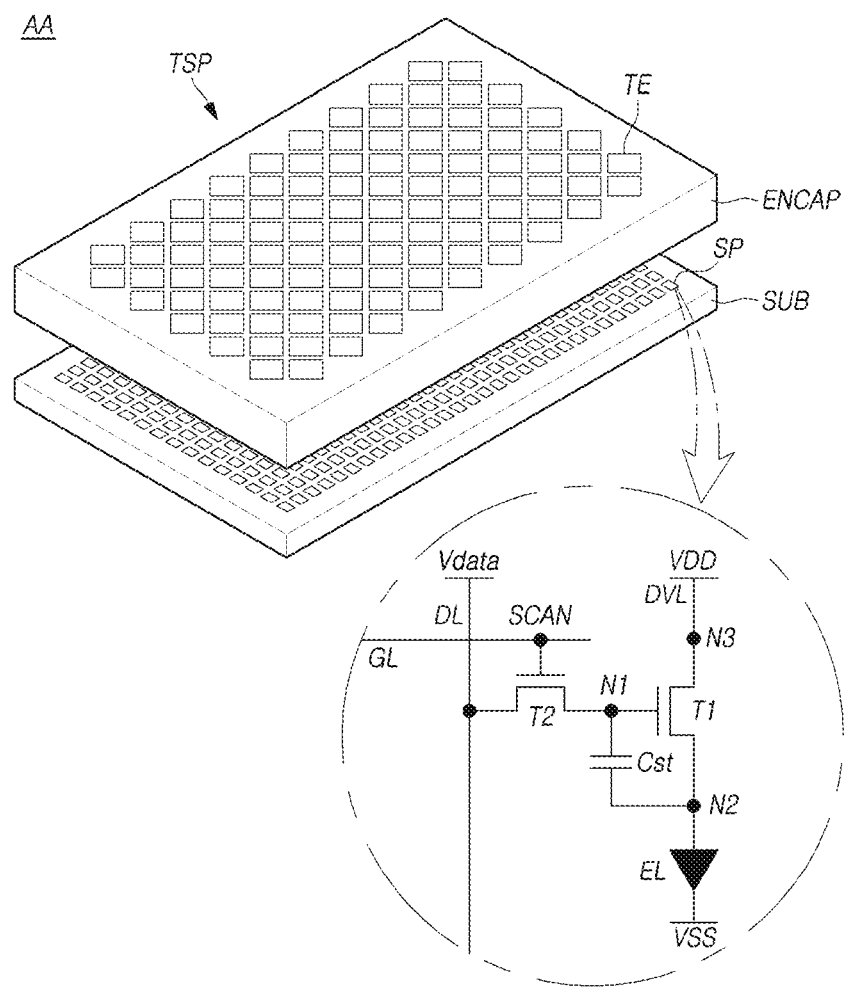
FIG. 2 illustrates a structure in which a touch screen panel is embedded in a display panel of a touch display device according to an embodiment of the present disclosure.

FIG. 2 illustrates a structure in which a touch screen panel is embedded in a display panel of a touch display device according to embodiments of the present disclosure.

Referring to FIG. 2, a plurality of subpixels SP may be disposed on a substrate SUB in a display area AA of the display panel 110 in the touch display device 100 according to embodiments of the present disclosure.

Each subpixel SP may include a light emitting diode EL, a first transistor T1 for driving the light emitting diode EL, a second transistor T2 for transmitting a data voltage Vdata to a first node N1 of the first transistor T1, and a storage capacitor Cst for maintaining a constant voltage for one frame.

The first transistor T1 may include a first node N1 to which a data voltage Vdata may be supplied through the second transistor T2, a second node N2 electrically connected to the light emitting diode EL, and a third node N3 to which a driving voltage VDD is supplied from a driving voltage line DVL. The first node N1 may be a gate node, the second node N2 may be a source node or a drain node, and the third node N3 may be a drain node or a source node. The first transistor T1 may also be referred to as a driving transistor for driving the light emitting diode EL.

The light emitting diode EL may include a first electrode (e.g., an anode electrode), a light emitting layer, and a second electrode (e.g., a cathode electrode). The first electrode may be electrically connected to the second node N2 of the first transistor T1, and the second electrode may be supplied with a base voltage VSS.

The light emitting layer of the light emitting diode EL may be an organic light emitting layer containing an organic material. In this case, the light emitting diode EL may be an organic light emitting diode.

The second transistor T2 may be controlled to be turned on and off by a scan signal SCAN supplied through a gate line GL, and may be electrically connected between the first node N1 of the first transistor T1 and the data line DL. The second transistor T2 may also be referred to as a switching transistor.

When the second transistor T2 is turned on by the scan signal SCAN, a data voltage Vdata supplied through the data line DL is transmitted to the first node N1 of the first transistor T1.

The storage capacitor Cst may be electrically connected between the first node N1 and the second node N2 of the first transistor T1.

Each subpixel SP may have a 2T1C structure including two transistors T1, T2 and one capacitor Cst, and may further include one or more transistors, or may further include one or more capacitors in some cases.

The storage capacitor Cst may be an external capacitor which is intentionally designed to be provided outside the first transistor T1, instead of a parasitic capacitor which is provided between the first node N1 and the second node N2 of the first transistor T1.

Each of the first transistor T1 and the second transistor T2 may be an n-type transistor or a p-type transistor.

On the other hand, circuit elements such as a light emitting diode EL, two or more transistors T1, T2, and one or more capacitors Cst, may be disposed in the display panel 110. Since the circuit elements are vulnerable to external moisture or oxygen, an encapsulation layer ENCAP for preventing external moisture or oxygen from penetrating into the circuit elements may be disposed in the display panel 110.

The encapsulation layer ENCAP may be formed as a single layer or as multiple layers. For example, when the encapsulation layer ENCAP is formed as multiple layers, the encapsulation layer ENCAP may include one or more inorganic encapsulation layers and one or more organic encapsulation layers. For example, the encapsulation layer ENCAP may be configured to include a first inorganic encapsulation layer, an organic encapsulation layer, and a second inorganic encapsulation layer. Here, the organic encapsulation layer may be located between the first inorganic encapsulation layer and the second inorganic encapsulation layer. However, the configuration of the encapsulation layer is not limited thereto.

The first inorganic encapsulation layer may be formed on the second electrode (e.g., a cathode electrode) to be closest to the light emitting diode EL. The first inorganic encapsulation layer may include an inorganic insulating material that enables low temperature deposition, such as silicon nitride (SiNx), silicon oxide (SiOx), silicon oxynitride (SiON), aluminum oxide ($Al_2O_3$), or the like. Accordingly, since the first inorganic encapsulation layer is deposited in a low temperature atmosphere, the first inorganic encapsulation layer may prevent the light emitting layer (organic light emitting layer), which is vulnerable to a high temperature atmosphere, from being damaged during the deposition process.

The organic encapsulation layer may have a smaller area than the first inorganic encapsulation layer, and may be formed such that both ends of the first inorganic encapsulation layer are exposed. The organic encapsulation layer may serve as a buffer for relieving the stress between the respective layers due to bending of the touch display device 100, and may enhance the planarization performance. The organic encapsulation layer may include an organic insulating material, such as an acrylic resin, an epoxy resin, polyimide, polyethylene, silicon oxycarbide (SiOC), or the like.

The second inorganic encapsulation layer may be formed on the organic encapsulation layer to cover the upper surface and the side surface of each of the organic encapsulation layer and the first inorganic encapsulation layer. As a result, the second inorganic encapsulation layer may minimize or prevent external moisture or oxygen from penetrating into the first inorganic encapsulation layer and the organic encapsulation layer. The second inorganic encapsulation layer may include an inorganic insulating material such as silicon nitride (SiNx), silicon oxide (SiOx), silicon oxynitride (SiON), aluminum oxide ($Al_2O_3$), or the like.

The touch screen panel TSP may be on the encapsulation layer ENCAP in the touch display device 100 according to embodiments of the present disclosure. For example, a plurality of touch electrodes TE constituting the touch screen panel TSP may be disposed on the encapsulation layer ENCAP in the touch display device 100.

The touch display device 100 may sense a touch by a mutual-capacitance scheme or a self-capacitance scheme, as a capacitance based touch sensing scheme.

In case of a touch sensing scheme based on mutual-capacitance, a plurality of touch electrodes TE may be classified as touch driving electrodes which is supplied touch driving signals through touch driving lines, and touch sensing electrodes which supplies touch sensing signals through touch sensing lines and forms capacitances with the touch driving electrodes. Here, the touch driving lines and the touch sensing lines may be referred to as touch lines. Also, the touch driving signals and the touch sensing signals may be referred to as touch signals.

In case of the touch sensing scheme based on mutual-capacitance, the touch presence and the touch coordinate may be detected based on a change of mutual-capacitance formed between the touch driving electrode and the touch sensing electrode according to a presence of a pointer such as a finger, a pen, or the like.

In case of the touch sensing scheme based on self-capacitance, each touch electrode serves as both the touch driving electrode and the touch sensing electrode. That is, a touch driving signal is supplied to a touch electrode TE through a touch line, and a touch sensing signal generated in the touch electrode, to which the touch driving signal is supplied, is transmitted through the same touch line. Accordingly, in case of the touch sensing scheme based on self-capacitance, there is no distinction between the touch driving electrode and the touch sensing electrode and no distinction between the touch driving line and the touch sensing line.

In case of the touch sensing scheme based on self-capacitance, the touch presence and a touch coordinate may be detected based on a change in capacitance formed between a pointer such as a finger, a pen, or the like, and a touch electrode TE.

Thus, the touch display device 100 may sense a touch by the touch sensing scheme based on mutual-capacitance or the touch sensing scheme based on self-capacitance.

Figure 3:
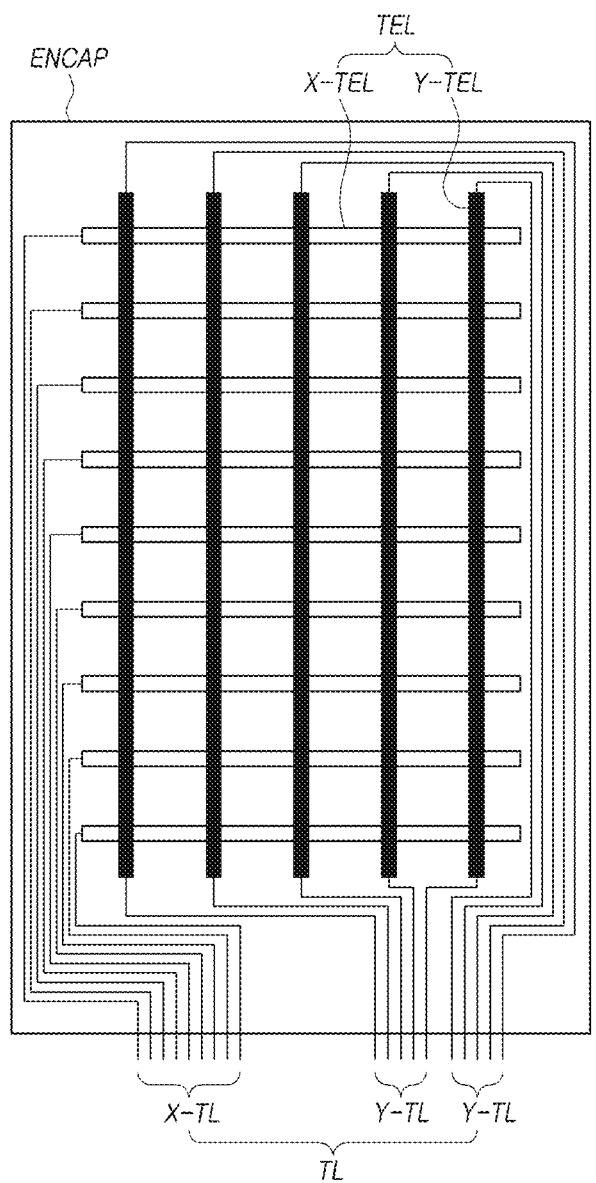
FIG. 3 illustrates a structure of touch electrodes for touch sensing operation based on mutual-capacitance in a touch display device according to embodiments of the present disclosure.

FIG. 3 illustrates a structure of touch electrodes for touch sensing operation based on mutual-capacitance in a touch display device according to embodiments of the present disclosure.

Referring to FIG. 3, the structure of touch electrodes for touch sensing operation based on mutual-capacitance in the touch display device 100 according to embodiments of the present disclosure may include a plurality of X-touch electrode lines X-TEL and a plurality of Y-touch electrode lines Y-TEL. Here, the plurality of X-touch electrode lines X-TEL and the plurality of Y-touch electrode lines Y-TEL may be located on the encapsulation layer ENCAP.

A plurality of X-touch electrode lines X-TEL may be disposed in a first direction, and a plurality of Y-touch electrode lines Y-TEL may be disposed in a second direction different from the first direction.

In the present specification, the first direction and the second direction may be relatively different directions. For example, the first direction may be an x-axis direction and the second direction may be a y-axis direction. Conversely, the first direction may be the y-axis direction and the second direction may be the x-axis direction. Further, the first direction and the second direction may be orthogonal to each other, but may not be orthogonal to each other. Also, rows and columns in the present specification are relative, and the rows and columns may be changed according to a viewing point of view.

Each of the plurality of X-touch electrode line X-TEL may be composed of a plurality of electrically connected X-touch electrodes, and each of the plurality of Y-touch electrode line Y-TEL may be composed of a plurality of electrically connected Y-touch electrodes.

Here, the plurality of X-touch electrodes and the plurality of Y-touch electrodes correspond to a plurality of touch electrodes TE having different roles (functions) respectively.

For example, the plurality of X-touch electrodes constituting the X-touch electrode line X-TEL may be touch driving electrodes, and the plurality of Y-touch electrodes constituting the Y-touch electrode line Y-TEL may be touch sensing electrodes. In this case, the plurality of X-touch electrode lines X-TEL will correspond to a plurality of touch driving electrode lines, and the plurality of Y-touch electrode lines Y-TEL will correspond to a plurality of touch sensing electrode lines.

Conversely, the plurality of X-touch electrodes constituting the plurality of X-touch electrode lines X-TEL may be touch sensing electrodes, and the plurality of Y-touch electrodes constituting the plurality of Y-touch electrode lines Y-TEL may be touch driving electrodes. In this case, the plurality of X-touch electrode lines X-TEL will correspond to a plurality of touch sensing electrode lines, and the plurality of Y-touch electrode lines Y-TEL will correspond to a plurality of touch driving electrode lines.

A touch sensor metal for touch sensing may include a plurality of touch routing lines TL in addition to the plurality of X-touch electrode lines X-TEL and the plurality of Y-touch electrode lines Y-TEL.

The plurality of touch routing lines TL may include at least one X-touch routing line X-TL connected to the plurality of X-touch electrode lines X-TEL, and at least on Y-touch routing line Y-TL connected to the plurality of Y-touch electrode lines Y-TEL.

In addition, such a touch display device 100 may be used not only as mobile devices such as smartphones and tablet PCs, but also in automotive displays. In this case, the touch display device 100 may use an antenna to communicate with other devices.

In this case, when a touch display device 100 using the antenna transmits and receives a radio signal in a high frequency band, electromagnetic interference between the touch driving signal transmitted through the touch electrode line TEL and the radio signal causes tends to deteriorate a performance of the radio signal transmission and reception and touch sensing performance.

In order to solve this problem, the touch display device 100 of the present disclosure may arrange a pseudo touch electrode line capable of reducing electromagnetic interference between the radio signal and a touch driving signal in a non-display area.

Figure 4:
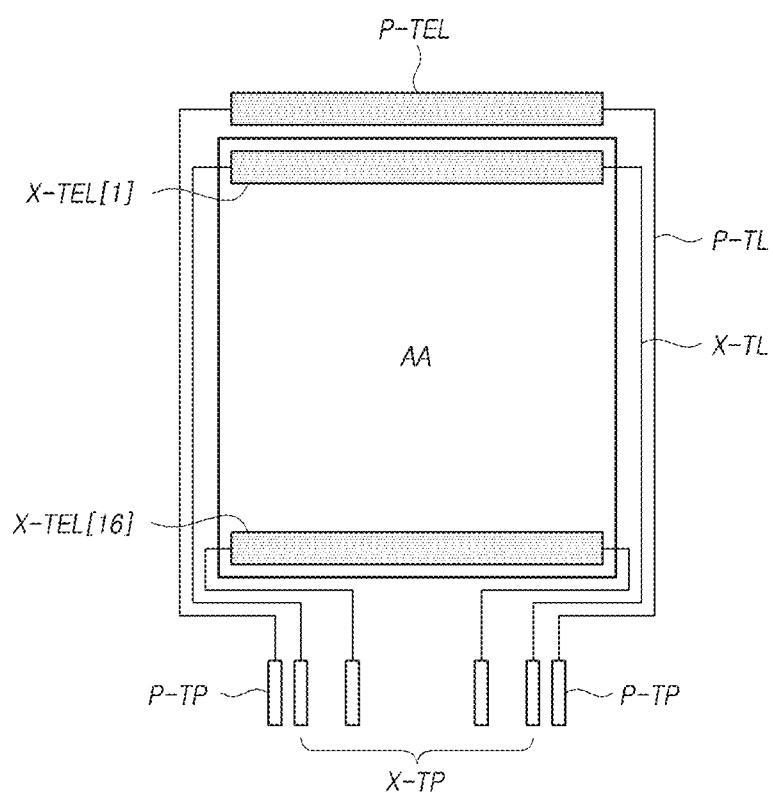
FIG. 4 illustrates an exemplary structure in which pseudo touch electrode lines are arranged in a touch display device according to embodiments of the present disclosure.

FIG. 4 illustrates an exemplary structure in which pseudo touch electrode lines are arranged in a touch display device according to embodiments of the present disclosure.

Referring to FIG. 4, the touch display device 100 according to embodiments of the present disclosure may include a plurality of X-touch electrode lines X-TEL and a plurality of Y-touch electrode lines Y-TEL disposed in a display area AA of the display panel 110 and pseudo touch electrode lines P-TEL disposed in a non-display area.

Here, it illustrates a case, for convenience of explanation, in which touch driving signals are supplied through 16 X-touch electrode lines X-TEL[1]-X-TEL[16] disposed in the first direction in the display area AA and the pseudo touch electrode line P-TEL is disposed in a direction parallel to the X-touch electrode line X-TEL in the non-display area.

Each of the 16 X-touch electrode lines X-TEL[1]-X-TEL[16] is electrically connected to corresponding X-touch pad X-TP through a X-touch routing line X-TL. That is, the X-touch electrode disposed at the outermost of the plurality of X-touch electrodes included in an X-touch electrode line X-TEL is electrically connected to the corresponding X-touch pad X-TP through the X-touch routing line X-TL.

One or more pseudo touch electrode lines P-TEL may be arranged in parallel with the X-touch electrode lines X-TEL[1]-X-TEL[16] to which the touch driving signal is supplied in the non-display area. At this time, a pseudo touch electrode line P-TEL is electrically connected to the corresponding pseudo touch pad P-TP through a pseudo touch routing line P-TL.

In this configuration, electromagnetic interference caused by the touch driving signal may be counterbalanced by supplying a pseudo touch driving signal, which has a phase opposite to the touch driving signal supplied through a plurality of X-touch electrode lines X-TEL[1]-X-TEL[16], to the pseudo touch electrode line P-TEL located in the non-display area.

At this time, one pseudo touch electrode line P-TEL may be connected to one pseudo touch routing line P-TL, but a plurality of pseudo touch electrode lines P-TEL spaced apart by regular intervals may be connected to one pseudo touch routing line P-TL. Accordingly, electromagnetic interference between the touch driving signal and the radio signal may be effectively reduced.

Figure 5:
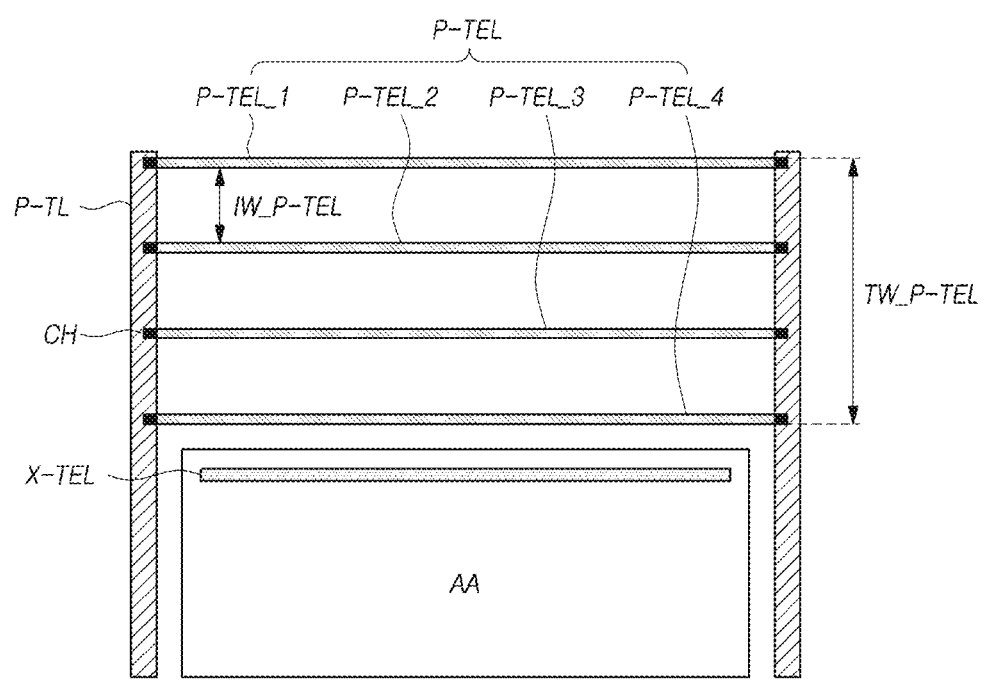
FIG. 5 illustrates an exemplary diagram in which a plurality of pseudo touch electrode lines are connected to a pseudo touch routing line in the touch display device according to embodiments of the present disclosure.

FIG. 5 illustrates an exemplary diagram in which a plurality of pseudo touch electrode lines are connected to a pseudo touch routing line in the touch display device according to embodiments of the present disclosure.

Referring to FIG. 5, a plurality of pseudo touch electrode lines P-TEL_1-P-TEL_4 extending to a direction parallel to a plurality of X-touch electrode lines X-TEL may be spaced apart by regular intervals to be connected to one pseudo touch routing line P-TL in order to reduce electromagnetic interference in the touch display device 100 according to embodiments of the present disclosure.

For example, a plurality of pseudo touch electrode lines P-TEL_1-P-TEL_4 extending from the pseudo touch routing line P-TL which is extended in the y direction along the side surface of the display area AA may be arranged to be spaced apart from each other by a reference interval IW_P-TEL of a predetermined distance along the non-display area. At this time, the plurality of pseudo touch electrode lines P-TEL_1-P-TEL_4 extending from the pseudo touch routing line P-TL are extended in a direction parallel to the X-touch electrode line X-TEL which is disposed in the display area AA and the touch driving signal TDS is supplied.

In this case, the plurality of pseudo touch electrode lines P-TEL_1-P-TEL_4 may be respectively connected to a pseudo touch routing line P-TL through contact holes CH.

The reference interval IW_P-TEL at which the plurality of pseudo touch electrode lines P-TEL_1-P-TEL_4 are spaced apart from each other in the non-display area may have a same value for each adjacent pseudo touch electrode lines P-TEL_1-P-TEL_4 or at least one reference interval IW_P-TEL may have a different value.

If the thickness of the plurality of pseudo touch electrode lines P-TEL_1-P-TEL_4 are ignored, the total value of the reference interval IW_P-TEL at which the plurality of pseudo touch electrode lines P-TEL_1-P-TEL_4 are spaced apart may be same as the total distance TW_P-TEL occupied by the plurality of pseudo touch electrode lines P-TEL_1-P-TEL_4 extending from one pseudo touch routing line P-TL in the non-display area.

At this time, when the reference interval IW_P-TEL at which the plurality of pseudo touch electrode lines P-TEL_1-P-TEL_4 are spaced apart from each other is smaller than the wavelength of the radio signal, the radio signal received in the touch display device 100 through the antenna may not pass through a space between the plurality of pseudo touch electrode lines P-TEL_1-P-TEL_4.

For example, when a radio signal received by the touch display device 100 has a frequency of 400 KHz, the radio signal has a wavelength of about 300/400 KHz=750 um. At this time, when the plurality of pseudo touch electrode lines P-TEL_1-P-TEL_4 are spaced apart by a reference interval IW_P-TEL of 750 um or less, the radio signal received by the touch display device 100 through the antenna may not pass through the space between the plurality of pseudo touch electrode lines P-TEL_1-P-TEL_4.

In this case, the radiation efficiency of the plurality of pseudo touch electrode lines P-TEL_1-P-TEL_4 spaced apart by the reference interval IW_P-TEL becomes equal to the radiation efficiency of one pseudo touch electrode line P-TEL which has a same entire interval TW_P-TEL and is formed into an integrated one.

Figure 6:
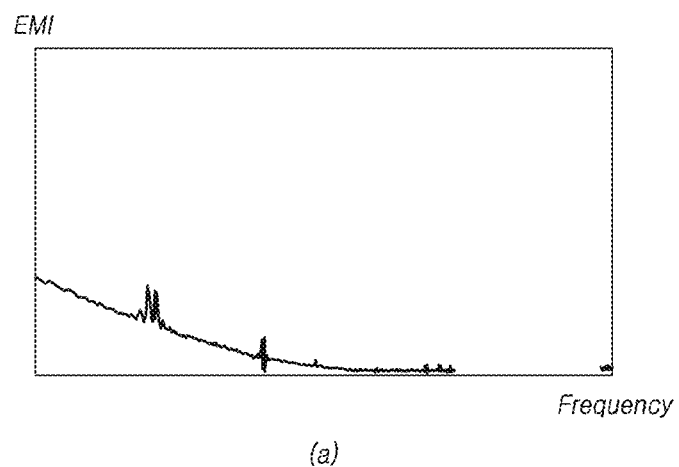
FIG. 6 illustrates a graph comparing the radiation efficiency of a pseudo touch electrode line having an integrated structure with a case in which a plurality of pseudo touch electrode lines are spaced apart by a reference interval in the touch display device according to embodiments of the present disclosure.
Figure 6:
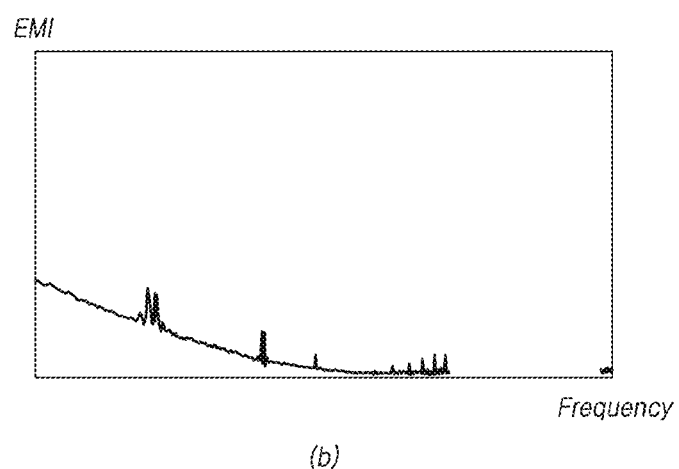

FIG. 6 illustrates a graph comparing the radiation efficiency of a pseudo touch electrode line having an integrated structure with a case in which a plurality of pseudo touch electrode lines are spaced apart by a reference interval in the touch display device according to embodiments of the present disclosure.

Referring to FIG. 6, the pseudo touch electrode line P-TEL located in the non-display area of the display panel 110 may be formed into an integrated structure extending from one pseudo touch routing line P-TL, or a plurality of pseudo touch electrode lines P-TEL may be disposed spaced apart from each other by regular intervals in the touch display device 100 according to embodiments of the present disclosure.

At this time, when the reference interval IW_P-TEL at which the plurality of pseudo touch electrode lines P-TEL_1-P-TEL_4 are spaced apart from each other is smaller than the wavelength of the radio signal, the radio signal received in the touch display device 100 through the antenna may not pass through a space between the plurality of pseudo touch electrode lines P-TEL_1-P-TEL_4. In this case, the radiation efficiency of the plurality of pseudo touch electrode lines P-TEL_1-P-TEL_4 spaced apart by the reference interval IW_P-TEL ((a) of FIG. 6) becomes equal to the radiation efficiency of one pseudo touch electrode line P-TEL which has a same entire interval TW_P-TEL and is formed into an integrated one ((b) of FIG. 6).

Therefore, it is possible to reduce noise caused by electromagnetic interference and to secure a space for arranging additional pseudo touch electrode lines P-TEL between the plurality of pseudo touch electrode lines P-TEL_1-P-TEL_4 by spacing apart the plurality of pseudo touch electrode lines P-TEL_1-P-TEL_4 extending from one pseudo touch routing line P-TL from each other by a reference interval IW_P-TEL smaller than the wavelength of the radio signal.

As a result, it is possible to further reduce electromagnetic interference caused by the radio signal and the touch driving signal TDS.

At this time, it is possible to further counterbalance electromagnetic interference caused by the touch driving signal TDS by supplying a pseudo touch driving signal, which has a phase opposite to the touch driving signal TDS supplied through the plurality of X-touch electrode lines X-TEL[1]-X-TEL[16], through the pseudo touch electrode line P-TEL in the non-display area.

Figure 7:
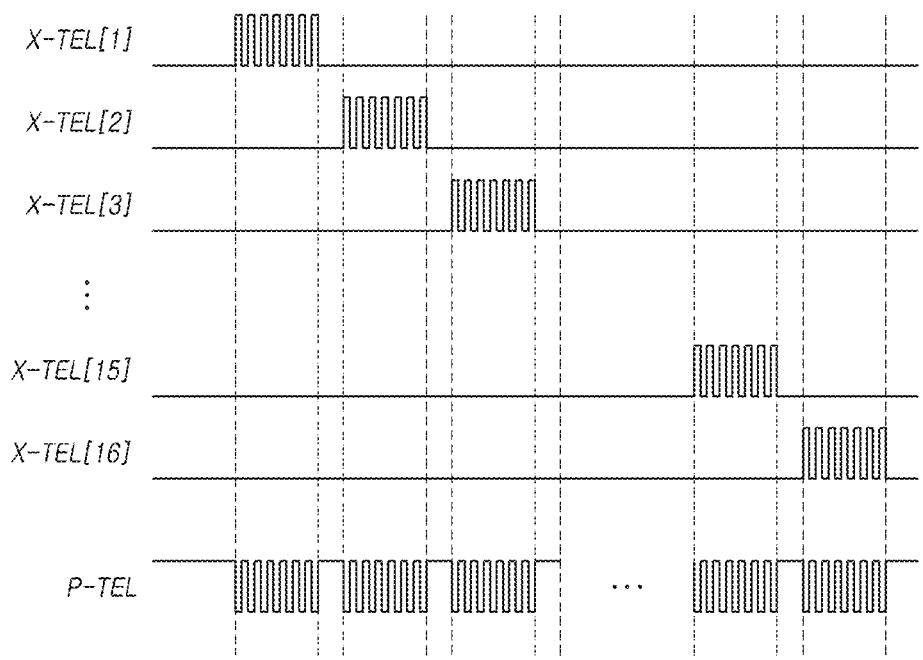
FIG. 7 illustrates an exemplary diagram of touch signals supplied to a plurality of touch electrode lines and a pseudo touch electrode line in the touch display device according to embodiments of the present disclosure.

FIG. 7 illustrates a exemplary diagram of touch signals supplied to a plurality of touch electrode lines and a pseudo touch electrode line in the touch display device according to embodiments of the present disclosure.

Referring to FIG. 7, a plurality of X-touch electrode lines X-TEL may be disposed in the display area AA of the display panel 110 in the touch display device 100 according to embodiments of the present disclosure. Here, it illustrates a case in which 16 X-touch electrode lines X-TEL[1]-X-TEL[16] are arranged as an example.

When 16 X-touch electrode lines X-TEL[1]-X-TEL[16] are disposed in the display area AA of the display panel 110, touch driving signals TDS in the form of a pulse may be supplied to each of 16 X-touch electrode lines X-TEL[1]-X-TEL[16] at different times.

In this case, a pseudo touch driving signal having a phase opposite to that of the touch driving signal TDS may be supplied to the pseudo touch electrode lines P-TEL.

Here, it illustrates a case in which the same pseudo touch driving signal is supplied to a plurality of pseudo touch electrode lines P-TEL_1-P-TEL_4 since the plurality of pseudo touch electrode lines P-TEL_1-P-TEL_4 are extend from one pseudo touch routing line P-TL.

As described above, it is possible to counterbalance electromagnetic interference caused by the touch driving signal by supplying the pseudo touch driving signal, which has a phase opposite to the touch driving signal TDS supplied through the plurality of X-touch electrode lines X-TEL[1]-X-TEL[16], through the pseudo touch electrode line P-TEL located in the non-display area.

Figure 8:
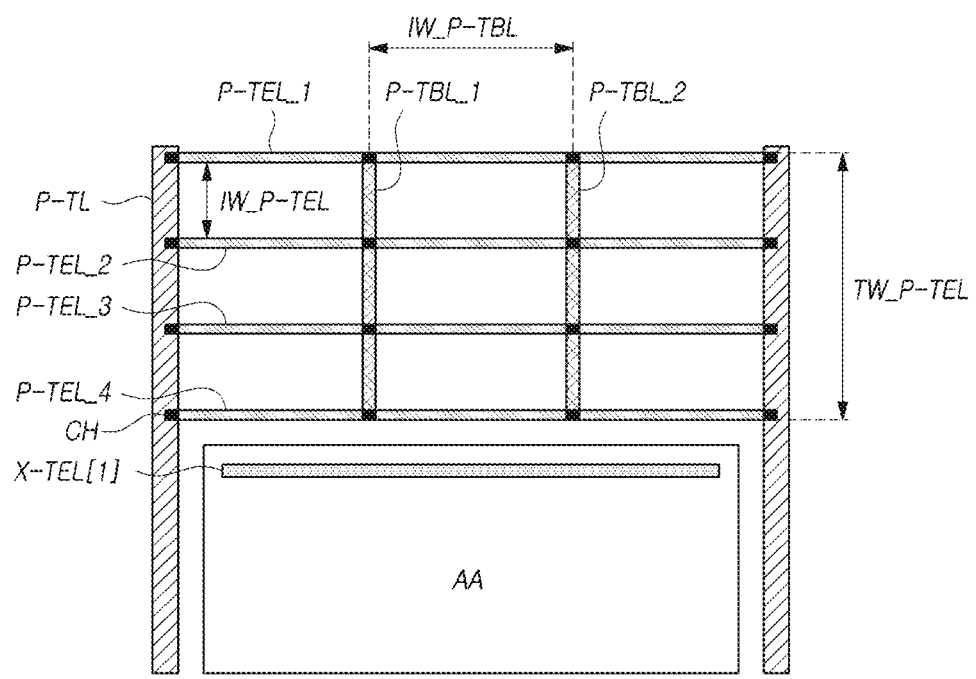
FIG. 8 illustrates another exemplary case in which a plurality of pseudo touch electrode lines are connected to one pseudo touch routing line in the touch display device according to embodiments of the present disclosure.

FIG. 8 illustrates another exemplary case in which a plurality of pseudo touch electrode lines are connected to one pseudo touch routing line in the touch display device according to embodiments of the present disclosure.

Referring to FIG. 8, a plurality of pseudo touch electrode lines P-TEL_1-P-TEL_4 extending to a direction parallel to a plurality of X-touch electrode lines X-TEL may be spaced apart by regular intervals to be connected to one pseudo touch routing line P-TL in order to reduce electromagnetic interference in the touch display device 100 according to embodiments of the present disclosure.

For example, a plurality of pseudo touch electrode lines P-TEL_1-P-TEL_4 extending from the pseudo touch routing line P-TL which is extended in the y direction along the side surface of the display area AA may be arranged to be spaced apart from each other by a reference interval IW_P-TEL of a predetermined distance along the non-display area.

At this time, when the reference interval IW_P-TEL at which the plurality of pseudo touch electrode lines P-TEL_1-P-TEL_4 are spaced apart from each other is smaller than the wavelength of the radio signal, the radio signal received in the touch display device 100 through the antenna may not pass through a space between the plurality of pseudo touch electrode lines P-TEL_1-P-TEL_4. In this case, the radiation efficiency of the plurality of pseudo touch electrode lines P-TEL_1-P-TEL_4 spaced apart by the reference interval IW_P-TEL becomes equal to the radiation efficiency of one pseudo touch electrode line P-TEL which has a same entire interval TW_P-TEL and is formed into an integrated one.

On the other hand, a plurality of pseudo touch electrode lines P-TEL_1-P-TEL_4 extending from one pseudo touch routing line P-TL may be connected to each other through at least one or more pseudo touch bridge lines P-TBL_1, P-TBL_2.

At least one or more pseudo touch bridge lines P-TBL_1, P-TBL_2 may synchronize with the pseudo touch driving signal supplied along the plurality of pseudo touch electrode lines P-TEL_1-P-TEL_4, and may prevent signal delay of the pseudo touch driving signal. Also, it is possible to enhance a blocking effect of the radio signal received through the antenna by adjusting the interval IW_P-TBL between the plurality of pseudo touch bridge lines P-TBL_1, P-TBL_2.

Figure 9:
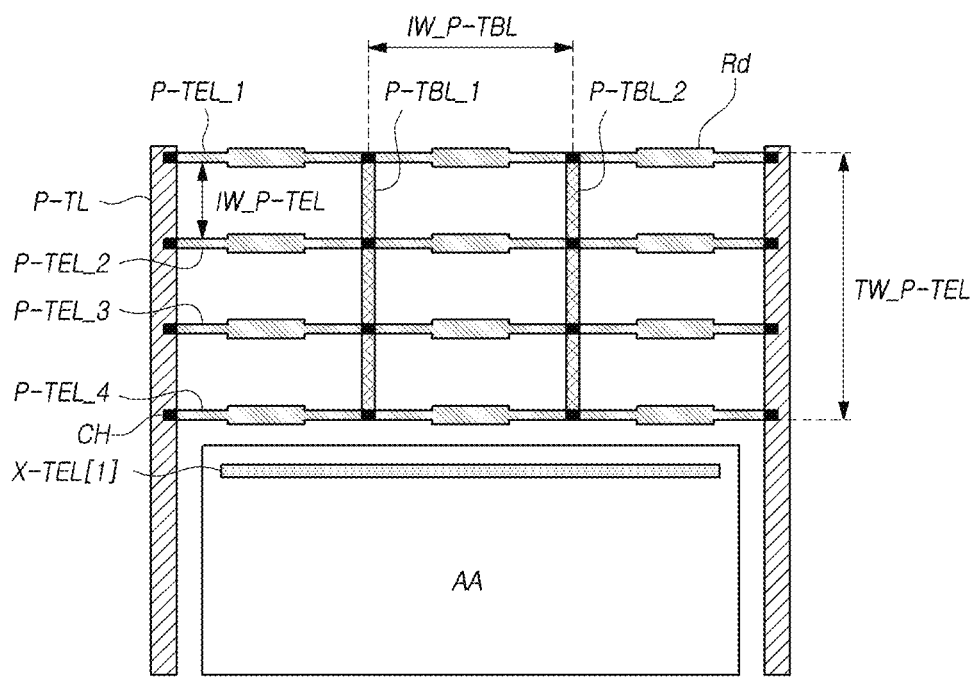
FIG. 9 illustrates an exemplary diagram of a case in which a plurality of pseudo touch electrode lines are connected to one pseudo touch routing line in the touch display device according to embodiments of the present disclosure.

FIG. 9 illustrates an exemplary diagram of a case in which a plurality of pseudo touch electrode lines are connected to one pseudo touch routing line in the touch display device according to embodiments of the present disclosure.

Referring to FIG. 9, a plurality of pseudo touch electrode lines P-TEL_1-P-TEL_4 extending to a direction parallel to a plurality of X-touch electrode lines X-TEL may be spaced apart by regular intervals to be connected to one pseudo touch routing line P-TL in order to reduce electromagnetic interference in the touch display device 100 according to embodiments of the present disclosure.

For example, a plurality of pseudo touch electrode lines P-TEL_1-P-TEL_4 extending from the pseudo touch routing line P-TL which is extended in the y direction along the side surface of the display area AA may be arranged to be spaced apart from each other by a reference interval IW_P-TEL of a predetermined distance along the non-display area.

At this time, when the reference interval IW_P-TEL at which the plurality of pseudo touch electrode lines P-TEL_1-P-TEL_4 are spaced apart from each other is smaller than the wavelength of the radio signal, the radio signal received in the touch display device 100 through the antenna may not pass through a space between the plurality of pseudo touch electrode lines P-TEL_1-P-TEL_4. In this case, the radiation efficiency of the plurality of pseudo touch electrode lines P-TEL_1-P-TEL_4 spaced apart by the reference interval IW_P-TEL becomes equal to the radiation efficiency of one pseudo touch electrode line P-TEL which has a same entire interval TW_P-TEL and is formed into an integrated one.

On the other hand, a plurality of pseudo touch electrode lines P-TEL_1-P-TEL_4 extending from one pseudo touch routing line P-TL may be connected to each other through at least one or more pseudo touch bridge lines P-TBL_1, P-TBL_2.

At least one or more pseudo touch bridge lines P-TBL_1, P-TBL_2 may synchronize with the pseudo touch driving signal supplied along the plurality of pseudo touch electrode lines P-TEL_1-P-TEL_4, and may prevent signal delay of the pseudo touch driving signal. Also, it is possible to enhance a blocking effect of the radio signal received through the antenna by adjusting the interval IW_P-TBL between the plurality of pseudo touch bridge lines P-TBL_1, P-TBL_2.

In addition, one or more delay resistor Rd for delaying the time of the pseudo touch driving signal may be disposed on each of the plurality of pseudo touch electrode lines P-TEL_1-P-TEL_4 extending from one pseudo touch routing line P-TL.

Here, it illustrates an exemplary case in which two pseudo touch bridge lines P-TBL_1, P-TBL_2 are disposed on four pseudo touch electrode lines P-TEL_1-P-TEL_4, and three delay resistors Rd are respectively disposed in horizontal direction at location between the pseudo touch bridge lines P-TBL_1, P-TBL_2.

Figure 10:
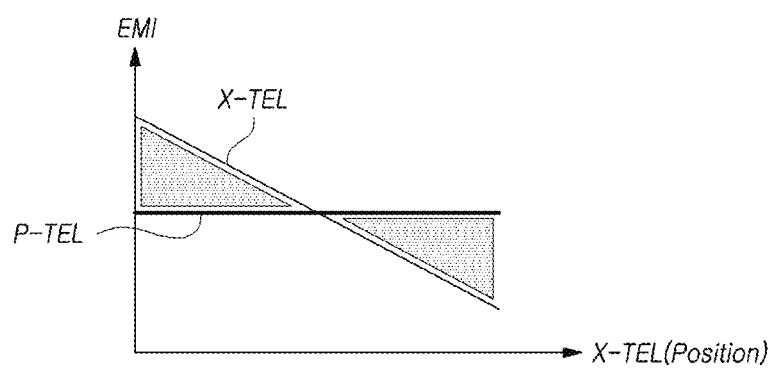
FIG. 10 illustrates a diagram for explaining a phenomenon in which electromagnetic interference is counterbalanced by a pseudo touch driving signal supplied through pseudo touch electrode lines in the touch display device according to embodiments of the present disclosure.

FIG. 10 illustrates a diagram for explaining a phenomenon in which electromagnetic interference is counterbalanced by a pseudo touch driving signal supplied through pseudo touch electrode lines in the touch display device according to embodiments of the present disclosure.

Referring to FIG. 10, a plurality of X-touch electrode lines X-TEL disposed in the display area AA of the display panel 110 may have different radiation efficiency of electromagnetic interference depending on the location in the touch display device 100 according to embodiments of the present disclosure.

On the other hand, when the same pseudo touch driving signal is supplied to a plurality of pseudo touch electrode lines P-TEL extending from one pseudo touch routing line P-TL in the non-display area, one type of radiation efficiency may appear and, therefore, the counterbalancing effect of electromagnetic interference vary with location.

In the touch display device 100 of the present disclosure, it is possible to enhance the counterbalancing effect of electromagnetic interference by arranging a plurality of pseudo touch routing lines P-TL, and a plurality of pseudo touch electrode lines P-TEL extended from each of the pseudo touch routing lines P-TL.

Figure 11:
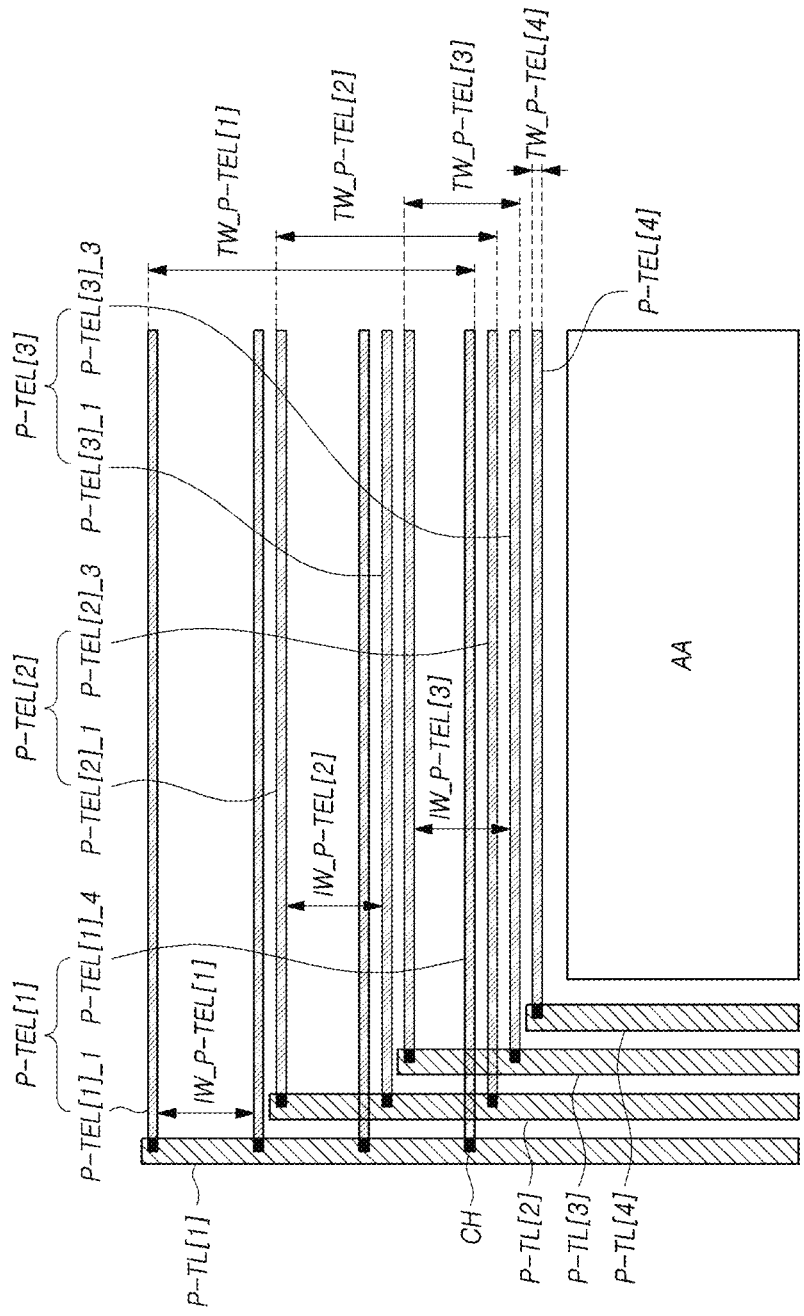
FIG. 11 illustrates an exemplary diagram of a case in which a plurality of pseudo touch electrode lines are connected to each of a plurality of pseudo touch routing lines in the touch display device according to embodiments of the present disclosure.

FIG. 11 illustrates an exemplary diagram of a case in which a plurality of pseudo touch electrode lines are connected to each of a plurality of pseudo touch routing lines in the touch display device according to embodiments of the present disclosure.

Referring to FIG. 11, a plurality of pseudo touch routing lines P-TL[1]-P-TL[4] extending along the side surface of the display panel 110 in the y direction may be disposed in the touch display device 100 according to embodiments of the present disclosure in order to reduce electromagnetic interference. In addition, at least one or more pseudo touch electrode lines P-TEL[1]_1-P-TEL[1]_4, P-TEL[2]_1-P-TEL[2]_3, P-TEL[3]_1-P-TEL[3]_2, P-TEL[4] may be extended to the x direction parallel to the plurality of X-touch electrode lines X-TEL from each of the pseudo touch routing lines P-TL[1]-P-TL[4].

At this time, at least one or more pseudo touch electrode lines P-TEL[1]_1-P-TEL[1]_4, P-TEL[2]_1-P-TEL[2]_3, P-TEL[3]_1-P-TEL[3]_2, P-TEL[4] extending from the plurality of pseudo touch routing lines P-TL[1]-P-TL[4] may be arranged to space apart from each other by reference intervals IW_P-TEL[1], IW_P-TEL[2], IW_P-TEL[3] of a predetermined distance, respectively.

For example, a plurality of first group pseudo touch electrode lines P-TEL[1]_1-P-TEL[1]_4 extending in the x direction from the first touch routing line P-TL[1] may be disposed to be spaced apart from each other by a first reference interval IW_P-TEL[1]. At this time, it is preferable that the first reference interval IW_P-TEL[1] between the plurality of first group pseudo touch electrode lines P-TEL[1]_1-P-TEL[1]_4 is smaller than the wavelength of the radio signal received through the antenna.

As described above, when the first reference interval IW_P-TEL[1] at which the plurality of first group pseudo touch electrode lines P-TEL[1]_1-P-TEL[1]_4 are spaced apart from each other is smaller than the wavelength of the radio signal, the radio signal received in the touch display device 100 through the antenna may not pass through a space between the plurality of first group pseudo touch electrode lines P-TEL[1]_1-P-TEL[1]_4.

In this case, the plurality of first group pseudo touch electrode lines P-TEL[1]_1-P-TEL[1]_4 may be respectively connected to the first pseudo touch routing line P-TL[1] through contact holes CH.

The first reference interval IW_P-TEL[1] at which the plurality of first group pseudo touch electrode lines P-TEL[1]_1-P-TEL[1]_4 are spaced apart from each other in the non-display area may have a same value or at least one first reference interval IW_P-TEL[1] may have a different value.

If the thickness of the plurality of first group pseudo touch electrode lines P-TEL[1]_1-P-TEL[1]_4 are ignored, the total value of the first reference interval IW_P-TEL[1] at which the plurality of first group pseudo touch electrode lines P-TEL[1]_1-P-TEL[1]_4 are spaced apart may be same as the first total distance TW_P-TEL[1] occupied by the plurality of first group pseudo touch electrode lines P-TEL[1]_1-P-TEL[1]_4 extending from the first pseudo touch routing line P-TL[1] in the non-display area.

Accordingly, the radiation efficiency of the plurality of first group pseudo touch electrode lines P-TEL[1]_1-P-TEL[1]_4 spaced apart by the first reference interval IW_P-TEL[1] becomes equal to the radiation efficiency of one pseudo touch electrode line P-TEL[1] which has a same entire interval TW_P-TEL[1] and is formed into an integrated one.

A plurality of second group pseudo touch electrode lines P-TEL[2]_1-P-TEL[2]_3 extending in the x direction from the second touch routing line P-TL[2] may be disposed to be spaced apart from each other by a second reference interval IW_P-TEL[2]. At this time, at least one (e.g., P-TEL[2]_1, P-TEL[2]_2) of the plurality of second group pseudo touch electrode lines P-TEL[2]_1-P-TEL[2]_3 may be disposed in a space between the plurality of first group pseudo touch electrode lines P-TEL[1]_1-P-TEL[1]_4.

Moreover, it is preferable that the second reference interval IW_P-TEL[2] between the plurality of second group pseudo touch electrode lines P-TEL[2]_1-P-TEL[2]_3 is smaller than the wavelength of the radio signal received through the antenna.

As described above, when the second reference interval IW_P-TEL[2] at which the plurality of second group pseudo touch electrode lines P-TEL[2]_1-P-TEL[2]_3 are spaced apart from each other is smaller than the wavelength of the radio signal, the radio signal received in the touch display device 100 through the antenna may not pass through a space between the plurality of second group pseudo touch electrode lines P-TEL[2]_1-P-TEL[2]_3.

In this case, the plurality of second group pseudo touch electrode lines P-TEL[2]_1-P-TEL[2]_3 may be respectively connected to the second pseudo touch routing line P-TL[2] through contact holes CH.

The second reference interval IW_P-TEL[2] at which the plurality of second group pseudo touch electrode lines P-TEL[2]_1-P-TEL[2]_3 are spaced apart from each other in the non-display area may have a same value or at least one second reference interval IW_P-TEL[2] may have a different value.

If the thickness of the plurality of second group pseudo touch electrode lines P-TEL[2]_1-P-TEL[2]_3 are ignored, the total value of the second reference interval IW_P-TEL[2] at which the plurality of second group pseudo touch electrode lines P-TEL[2]_1-P-TEL[2]_3 are spaced apart may be same as the second total distance TW_P-TEL[2] occupied by the plurality of second group pseudo touch electrode lines P-TEL[2]_1-P-TEL[2]_3 extending from the second pseudo touch routing line P-TL[2] in the non-display area.

Accordingly, the radiation efficiency of the plurality of second group pseudo touch electrode lines P-TEL[2]_1-P-TEL[2]_3 spaced apart by the second reference interval IW_P-TEL[2] becomes equal to the radiation efficiency of one pseudo touch electrode line P-TEL[2] which has a same entire interval TW_P-TEL[2] and is formed into an integrated one.

A plurality of third group pseudo touch electrode lines P-TEL[3]_1-P-TEL[3]_2 extending in the x direction from the third touch routing line P-TL[3] may be disposed to be spaced apart from each other by a third reference interval IW_P-TEL[3]. At this time, at least one (e.g., P-TEL[3]_1) of the plurality of third group pseudo touch electrode lines P-TEL[3]_1-P-TEL[3]_2 may be disposed in a space between the plurality of second group pseudo touch electrode lines P-TEL[2]_1-P-TEL[2]_3.

Moreover, it is preferable that the third reference interval IW_P-TEL[3] between the plurality of third group pseudo touch electrode lines P-TEL[3]_1-P-TEL[3]_2 is smaller than the wavelength of the radio signal received through the antenna.

As described above, when the third reference interval IW_P-TEL[3] at which the plurality of third group pseudo touch electrode lines P-TEL[3]_1-P-TEL[3]_2 are spaced apart from each other is smaller than the wavelength of the radio signal, the radio signal received in the touch display device 100 through the antenna may not pass through a space between the plurality of third group pseudo touch electrode lines P-TEL[3]_1-P-TEL[3]_2.

In this case, the plurality of third group pseudo touch electrode lines P-TEL[3]_1-P-TEL[3]_2 may be respectively connected to the third pseudo touch routing line P-TL[3] through contact holes CH.

The third reference interval IW_P-TEL[3] at which the plurality of third group pseudo touch electrode lines P-TEL[3]_1-P-TEL[3]_2 are spaced apart from each other in the non-display area may have a same value or at least one third reference interval IW_P-TEL[3] may have a different value.

If the thickness of the plurality of third group pseudo touch electrode lines P-TEL[3]_1-P-TEL[3]_2 are ignored, the total value of the third reference interval IW_P-TEL[3] at which the plurality of third group pseudo touch electrode lines P-TEL[3]_1-P-TEL[3]_2 are spaced apart may be same as the third total distance TW_P-TEL[3] occupied by the plurality of third group pseudo touch electrode lines P-TEL[3]_1-P-TEL[3]_2 extending from the third pseudo touch routing line P-TL[3] in the non-display area.

Accordingly, the radiation efficiency of the plurality of third group pseudo touch electrode lines P-TEL[3]_1-P-TEL[3]_2 spaced apart by the third reference interval IW_P-TEL[3] becomes equal to the radiation efficiency of one pseudo touch electrode line P-TEL[3] which has a same entire interval TW_P-TEL[3] and is formed into an integrated one.

A fourth group pseudo touch electrode line P-TEL[4] extending in the x direction from a fourth touch routing line P-TL[4] may be disposed. Here, it illustrates a case in which the fourth group pseudo touch electrode line P-TEL[4] is composed of one, as an example.

In this case, the fourth group pseudo touch electrode line P-TEL[4] may be respectively connected to the fourth pseudo touch routing line P-TL[4] through a contact hole CH.

In this way, when one fourth pseudo touch electrode line P-TEL[4] is extended from the fourth pseudo touch routing line P-TL[4], a total space TW_P-TEL[4] occupied by the fourth pseudo touch electrode line P-TEL[4] in the non-display area may be the thickness of the fourth pseudo touch electrode line P-TEL[4].

At this time, it is preferable that the first total interval TW_P-TEL[1] occupied by the plurality of first group pseudo touch electrode lines P-TEL[1]_1-P-TEL[1]_4 in the non-display area is different from the second total interval TW_P-TEL[2] occupied by the plurality of second group pseudo touch electrode lines P-TEL[2]_1-P-TEL[2]_3 in the non-display area.

For example, when the first group pseudo touch electrode lines P-TEL[1]_1-P-TEL[1]_4 are composed of four and the second group pseudo touch electrode lines P-TEL[2]_1-P-TEL[2]_3 are composed of three, the first total interval TW_P-TEL[1] occupied by the first group pseudo touch electrode lines P-TEL[1]_1-P-TEL[1]_4 in the non-display area may be larger than the second total interval TW_P-TEL[2] occupied by the second group pseudo touch electrode lines P-TEL[2]_1-P-TEL[2]_3 in the non-display area.

Also, when the second group pseudo touch electrode lines P-TEL[2]_1-P-TEL[2]_3 are composed of three and the third group pseudo touch electrode lines P-TEL[3]_1-P-TEL[3]_2 are composed of two, the second total interval TW_P-TEL[2] occupied by the second group pseudo touch electrode lines P-TEL[2]_1-P-TEL[2]_3 in the non-display area may be larger than the third total interval TW_P-TEL[3] occupied by the third group pseudo touch electrode lines P-TEL[3]_1-P-TEL[3]_2 in the non-display area.

Also, when the third group pseudo touch electrode lines P-TEL[3]_1-P-TEL[3]_2 are composed of two and the fourth group pseudo touch electrode line P-TEL[4] is composed of one, the third total interval TW_P-TEL[3] occupied by the third group pseudo touch electrode lines P-TEL[3]_1-P-TEL[3]_2 in the non-display area may be larger than the fourth total interval TW_P-TEL[4] occupied by the fourth group pseudo touch electrode line P-TEL[4] in the non-display area.

The total intervals TW_P-TEL[1], TW_P-TEL[2], TW_P-TEL[3], TW_P-TEL[4] of each group pseudo touch electrode lines P-TEL[1], P-TEL[2], P-TEL[3], P-TEL[4] may have different values. In this case, since the radiation efficiency by the each group pseudo touch electrode lines P-TEL[1], P-TEL[2], P-TEL[3], P-TEL[4] is different, electromagnetic interference generated from a plurality of X-touch electrode lines X-TEL may be counterbalanced by the various radiation efficiency.

In this way, when at least one or more pseudo touch electrode lines P-TEL[1]_1-P-TEL[1]_4, P-TEL[2]_1-P-TEL[2]_3, P-TEL[3]_1-P-TEL[3]_2, P-TEL[4] extending from the plurality of pseudo touch routing lines P-TL[1]-P-TL[4] are composed of a plurality of groups, the plurality of X-touch electrode lines X-TEL[1]-X-TEL[16] also may be divided into a plurality of groups. In this state, it is possible to reduce electromagnetic interference caused by the touch driving signals by supplying pseudo touch driving signals, which have a phase opposite to the touch driving signals applied through each group of the X-touch electrode lines, to each group of the pseudo touch electrode lines P-TEL[1]_1-P-TEL[1]_4, P-TEL[2]_1-P-TEL[2]_3, P-TEL[3]_1-P-TEL[3]_2, P-TEL[4].

Figure 12:
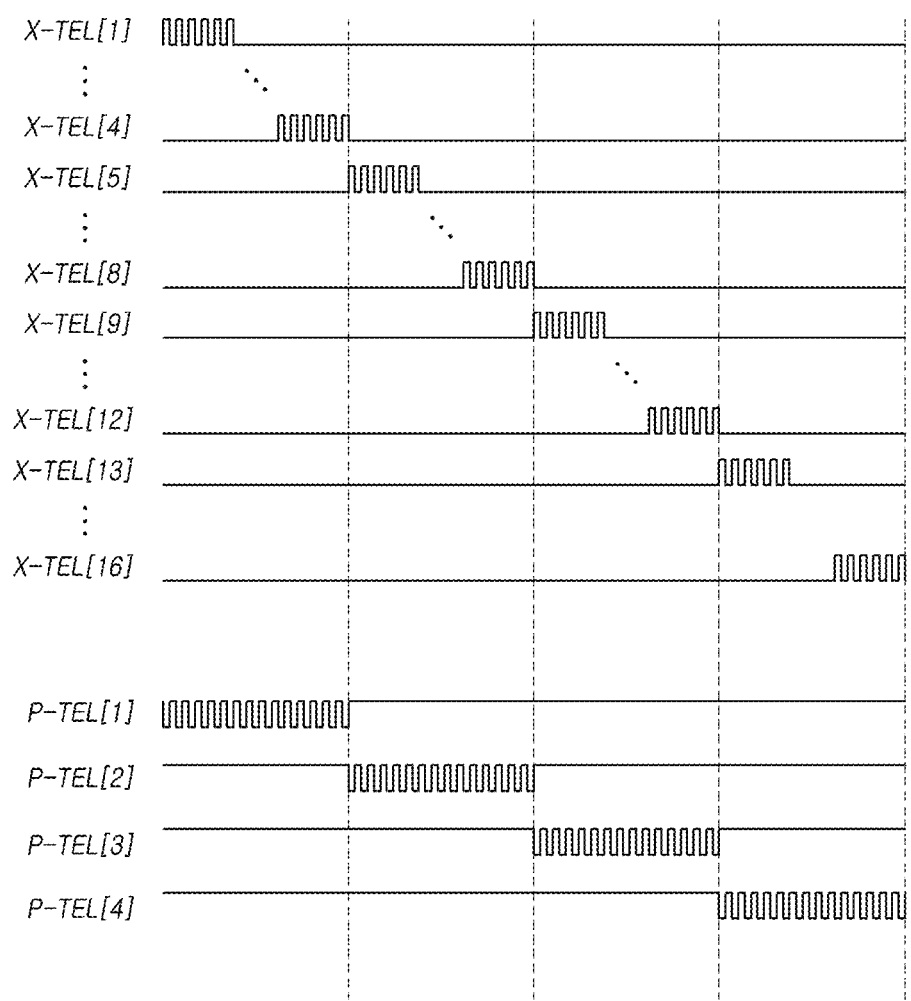
FIG. 12 illustrates a signal diagram of touch signals supplied to a plurality of touch electrode lines and a plurality of groups of pseudo touch electrode lines in the touch display device according to embodiments of the present disclosure.

FIG. 12 illustrates a signal diagram of touch signals supplied to a plurality of touch electrode lines and a plurality of groups of pseudo touch electrode lines in the touch display device according to embodiments of the present disclosure.

Referring to FIG. 12, a plurality of X-touch electrode lines X-TEL and a plurality of pseudo touch routing lines P-TL may be disposed in the display area AA of the display panel 110 in the touch display device 100 according to embodiments of the present disclosure. Here, it illustrates a case in which 16 X-touch electrode lines X-TEL[1]-X-TEL[16] and four pseudo touch routing lines P-TL[1]-P-TL[4] are arranged as an example.

When four pseudo touch routing lines P-TL[1]-P-TL[4] are arranged, the 16 X-touch electrode lines X-TEL[1]-X-TEL[16] may be divided into 4 groups and matched. For example, the first X-touch electrode line X-TEL[1] to the fourth X-touch electrode line X-TEL[4] may be matched to the first pseudo touch routing line P-TL[1] and the 5th X-touch electrode line X-TEL[5] to the 8th X-touch electrode line X-TEL[8] may be matched to the second pseudo touch routing line P-TL[2]. Also, the 9th X-touch electrode line X-TEL[9] to the 12th X-touch electrode line X-TEL[12] may be matched to the third pseudo touch routing line P-TL[3] and the 13th X-touch electrode line X-TEL[13] to the 16th X-touch electrode line X-TEL[16] may be matched to the fourth pseudo touch routing line P-TL[4].

At this time, pulse-type touch driving signals TDS may be supplied to the 16 X-touch electrode lines X-TEL[1]-X-TEL[16] arranged in the display area AA of the display panel 110 on different times, respectively.

On the other hand, pseudo touch driving signals, which have a phase opposite to the touch driving signals TDS applied to corresponding X-touch electrode lines X-TEL[1]-X-TEL[16], may be supplied to the first to fourth group pseudo touch electrode lines P-TEL[1]-P-TEL[4].

As described above, electromagnetic interference caused by the touch driving signals TDS may be reduced by supplying the pseudo touch driving signals, which have a phase opposite to the touch driving signals TDS applied through the plurality of X-touch electrode lines X-TEL[1]-X-TEL[16], to the plurality of groups of pseudo touch electrode lines P-TEL[1]-P-TEL[4] in the non-display area.

Figure 13:
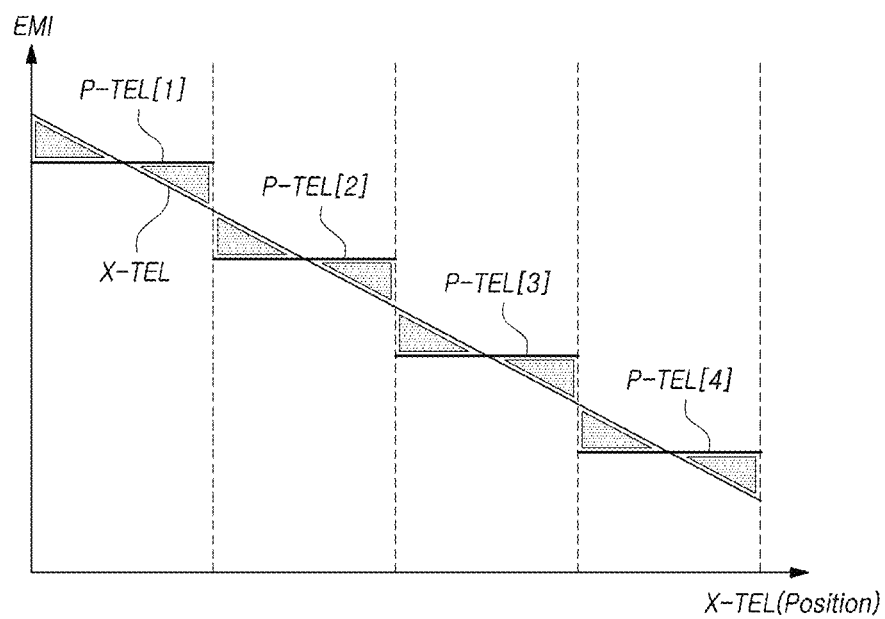
FIG. 13 illustrates a diagram for explaining a phenomenon in which electromagnetic interference is counterbalanced by the pseudo touch driving signals supplied to the plurality of groups of pseudo touch electrode lines in the touch display device according to embodiments of the present disclosure.

FIG. 13 illustrates a diagram for explaining a phenomenon in which electromagnetic interference is counterbalanced by the pseudo touch driving signals supplied to the plurality of groups of pseudo touch electrode lines in the touch display device according to embodiments of the present disclosure.

Referring to FIG. 13, a plurality of X-touch electrode lines X-TEL disposed in the display area AA of the display panel 110 has a different radiation efficiency of electromagnetic interference depending on the location in the touch display device 100 according to embodiments of the present disclosure.

In addition, when the different pseudo touch driving signals are supplied to the plurality of groups of pseudo touch electrode lines P-TEL[1]-P-TEL[4] extending from the plurality of pseudo touch routing lines P-TL[1]-P-TL[4] in the non-display area, a plurality of radiation efficiencies may be appeared, and thus the counterbalancing effect of electromagnetic interference may be different depending on the location.

As described above, when the plurality of groups of pseudo touch electrode lines P-TEL[1]-P-TEL[4] are dispersed in various locations, it is possible to enhance the counterbalancing effect of electromagnetic interference since the locations to counterbalance the electromagnetic interference caused by the touch driving signals TDS exist in several location.

It will be apparent to those skilled in the art that various modifications and variations can be made in the touch display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a display panel having a plurality of touch electrode lines including a plurality of X-touch electrode lines extending in a first direction and a plurality of Y-touch electrode lines extending in a second direction, and a plurality of subpixels in a display area;
a touch driving circuit for supplying a touch driving signal to the display panel and sensing a touch by detecting a touch sensing signal;
at least one pseudo touch routing line disposed in a non-display area along one side of the display panel in the second direction; and
a plurality of pseudo touch electrode lines extending from the at least one pseudo touch routing line away from the one side of the display panel and disposed in a non-display area along another side of the display panel,
wherein the plurality of pseudo touch electrode lines include at least one delay resistor for delaying time to transmit a signal.

2. The touch display device according to claim 1, wherein the plurality of X-touch electrode lines are touch driving electrode lines and the plurality of Y-touch electrode lines are touch sensing electrode lines.

3. The touch display device according to claim 1, wherein the plurality of pseudo touch electrode lines are disposed in a direction parallel to the plurality of X-touch electrode lines.

4. The touch display device according to claim 1, further comprising at least one pseudo touch bridge line electrically connecting adjacent pseudo touch electrode lines among the plurality of pseudo touch electrode lines.

5. The touch display device according to claim 4, wherein the at least one pseudo touch bridge line includes a plurality of pseudo touch bridge lines having intervals shorter than a wavelength of a radio signal received through an antenna between the pseudo touch bridge lines.

6. The touch display device according to claim 1, wherein at least one of the pseudo touch electrode lines is longer than at least one of the plurality of touch electrode lines.

7. The touch display device according to claim 1, wherein the plurality of pseudo touch electrode lines are spaced apart from each other at a reference interval.

8. The touch display device according to claim 7, wherein the reference interval is shorter than a wavelength of a radio signal received through an antenna.

9. The touch display device according to claim 8, wherein the reference interval is different from an adjacent reference interval.

10. A touch display device, comprising:
a display panel in which a plurality of touch electrode lines including a plurality of X-touch electrode lines extending in a first direction and a plurality of Y-touch electrode lines extending in a second direction, and a plurality of subpixels are disposed;

a touch driving circuit for supplying a touch driving signal to the display panel and sensing a touch by detecting a touch sensing signal;

at least one pseudo touch routing line disposed along a non-display area of the display panel; and a plurality of pseudo touch electrode lines extending from the at least one pseudo touch routing line and spaced apart from each other at a reference interval, wherein a pseudo touch driving signal having a phase opposite to the touch driving signal is supplied to the plurality of pseudo touch electrode lines.

11. The touch display device according to claim 10, wherein the plurality of X-touch electrode lines are touch driving electrode lines, and the plurality of Y-touch electrode lines are touch sensing electrode lines.

12. The touch display device according to claim 10, wherein the plurality of pseudo touch electrode lines are disposed in a direction parallel to the plurality of X-touch electrode lines.

13. The touch display device according to claim 10, wherein the reference interval is shorter than a wavelength of a radio signal received through an antenna.

14. The touch display device according to claim 10, further comprising at least one pseudo touch bridge line electrically connecting adjacent pseudo touch electrode lines among the plurality of pseudo touch electrode lines.

15. A touch display device, comprising:
a display panel in which a plurality of touch electrode lines including a plurality of X-touch electrode lines extending in a first direction and a plurality of Y-touch electrode lines extending in a second direction, and a plurality of subpixels are disposed;

a touch driving circuit for supplying a touch driving signal to the display panel and sensing a touch by detecting a touch sensing signal;

a plurality of pseudo touch routing lines disposed along a non-display area of the display panel; and a plurality of pseudo touch electrode lines extending respectively from the plurality of pseudo touch routing lines and spaced apart from each other at a reference interval, wherein the plurality of X-touch electrode lines are divided into a plurality of groups, and the plurality of pseudo touch routing lines are respectively matched to the plurality of groups of X-touch electrode lines.

16. The touch display device according to claim 15, wherein a number of a first group pseudo touch electrode lines among the plurality of pseudo touch electrode lines extending from a first of the plurality of pseudo touch routing lines is different from a number of second group pseudo touch electrode lines among the plurality of pseudo touch electrode lines extending from a second of the plurality of pseudo touch routing lines.

17. The touch display device according to claim 16, wherein a total interval occupied by the first group pseudo touch electrode lines is different from a total interval occupied by the second group pseudo touch electrode lines.

18. The touch display device according to claim 16, wherein at least one pseudo touch electrode line among the second group pseudo touch electrode lines is disposed in a space between the first group pseudo touch electrode lines.

19. The touch display device according to claim 16, wherein a first pseudo touch driving signal supplied to the first group pseudo touch electrode lines has a phase opposite to the touch driving signal supplied to a first group X-touch electrode lines among the plurality of X-touch electrode lines, and a second pseudo touch driving signal supplied to the second group pseudo touch electrode lines has a phase opposite to the touch driving signal supplied to a second group X-touch electrode lines among the plurality of X-touch electrode lines.

\* \* \* \* \*